United States Patent [19]
Wilson

[11] Patent Number: 4,852,204
[45] Date of Patent: Aug. 1, 1989

[54] WINDSHIELD WIPER STRUCTURE

[76] Inventor: Harold Wilson, 62-B Stoneridge Rd., Bridgeport, Conn. 06706

[21] Appl. No.: 112,531

[22] Filed: Oct. 26, 1987

[51] Int. Cl.$^4$ ................................................ B60S 1/34
[52] U.S. Cl. ............................ 15/250.07; 15/250.34; 15/250.35; 15/250.36; 219/203
[58] Field of Search .......... 15/250.05, 250.06, 250.07, 15/250.08, 250.09, 250.2, 250.34, 250.36; 219/203

[56] References Cited

U.S. PATENT DOCUMENTS

| | | | |
|---|---|---|---|
| 2,677,143 | 5/1954 | Blaney | 15/250.37 X |
| 2,908,028 | 10/1959 | Runton et al. | 15/250.36 |
| 3,461,477 | 8/1969 | Ikner | 15/250.36 |
| 3,606,630 | 9/1971 | Haas | 15/250.36 |
| 3,882,567 | 5/1975 | Herzog | 15/250.36 |
| 4,342,126 | 8/1982 | Neefeldt | 15/250.36 X |

*Primary Examiner*—Peter Feldman
*Attorney, Agent, or Firm*—Richard A. Craig

[57] ABSTRACT

Windshield wiper structure includes a wiper blade for engaging a windshield of a vehicle, and supporting elements including a metallic wiper blade carrier for carrying the blade, a metallic wiper arm connected to the carrier and pivotally mountable through a metallic end piece on a metallic post for reciprocating rotary motion about the post, a metallic spring engaging the post and the wiper arm for selectively resiliently urging the blade against or away from the windshield, and an electrical lead connected to the spring for connection to the electrical system of the vehicle. The structure uses the spring as a heating element for tending to melt snow and ice from the wiper blade and windshield. The supporting elements are electrically conductive and heat up with the spring. The blade and the supporting elements are coated with a non-wettable plastic material, a preferred example of which is polytetrafluoroethylene, which resists ice build-up.

5 Claims, 1 Drawing Sheet

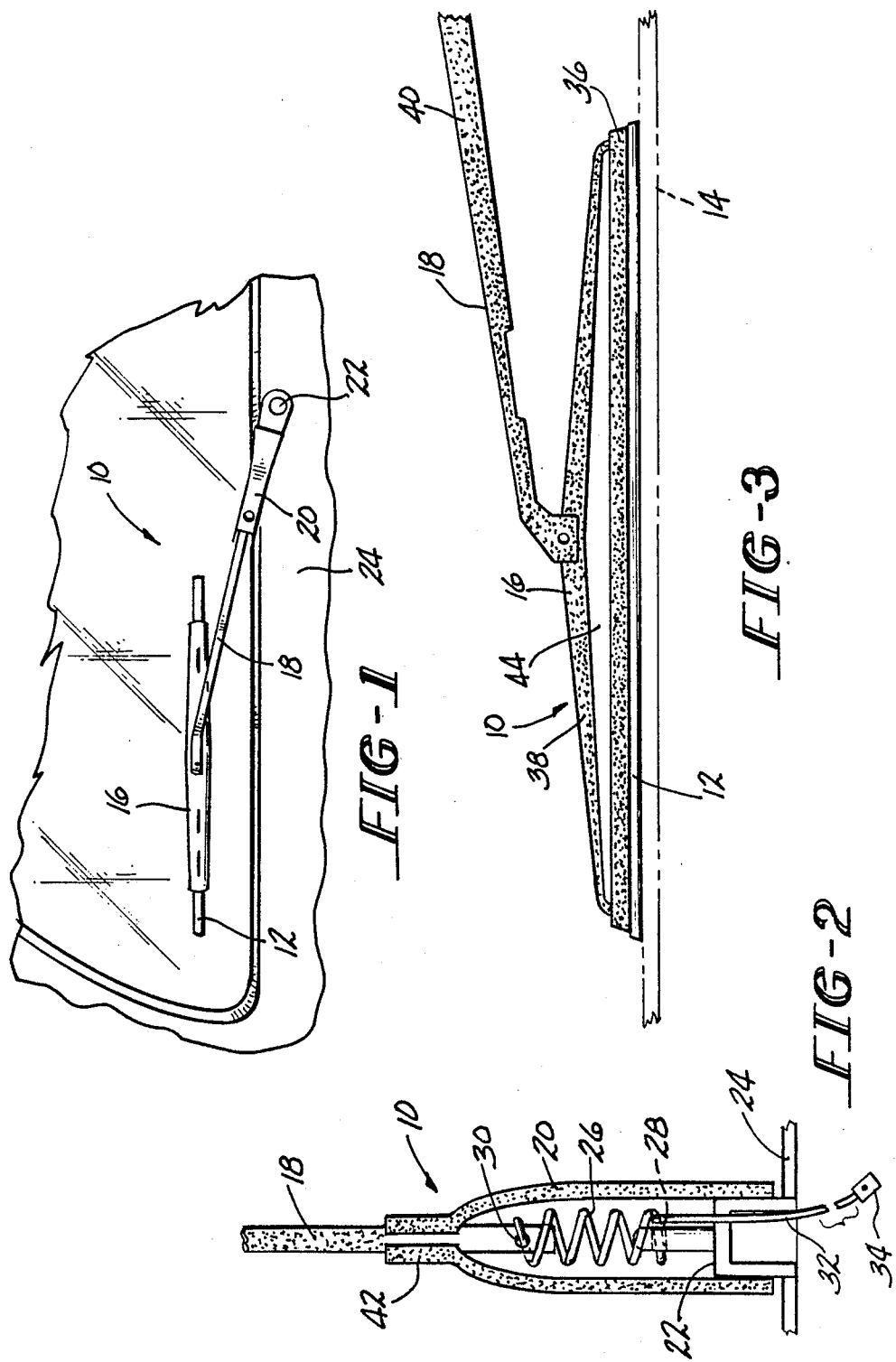

WINDSHIELD WIPER STRUCTURE

BACKGROUND OF THE INVENTION

This invention relates to windshield wiper structure and more particularly to such structure having improved performance characteristics, especially in icy conditions.

It is known in the art to embed a heating element within a windshield wiper blade and to connect that heating element to the electrical system of a vehicle, so that when the wiper is activated, a heating current of low amperage will heat the heating element to tend to melt snow and ice from the wiper blade and the supporting elements to permit the blade to conform to the windshield. This known structure is relatively complex and expensive, especially as to embedding the heating element within the wiper blade and as to providing necessary electrical wiring.

Typically, snow and ice are removed from the windshield itself by a treatment of the glass plus heat from either the defroster system or heating elements embedded in the windshield.

Accordingly, it is an important object of the invention to provide improved windshield wiper structure tending to clear snow and ice from the wiper blade and supporting elements, which structure is simpler and cheaper than known prior art structure.

It is another important object of the invention to provide such improved windshield wiper structure which is at least as efficient as the known prior art structure.

The foregoing and additional objects and advantages will become apparent hereinafter.

SUMMARY OF THE INVENTION

In one aspect, windshield wiper structure in accordance with the invention comprises a wiper blade for engaging a windshield of a vehicle, and supporting elements including a metallic wiper blade carrier for carrying the blade, and a metallic wiper arm connected to the wiper blade carrier. The wiper arm is pivotally mountable on a metallic post for reciprocating rotary motion about the post, and a metallic spring engages the post and the wiper arm for resiliently urging the blade against the windshield. An electrical lead is connected to the spring for connection to the electrical system of the vehicle, such as the motor circuit of the wiper structure. It is noted that this structure makes use of a member, namely, the spring, as a heating element for tending to melt snow and ice from the wiper blade and the supporting elements to permit the blade to conform to the windshield.

The windshield wiper blade is of rubber-like material and except for its edge, it and the supporting elements are provided with coatings of non-wettable plastic material, a preferred example of which is polytetrafluoroethylene, which is virtually unwettable by water and thus resists snow and ice build-up

DESCRIPTION OF THE DRAWING

FIG. 1 is a front elevation of windshield wiper structure embodying the invention, in position in which the blade engages the windshield of a vehicle which is shown fragmentarily;

FIG. 2 is an enlarged view taken from the left of FIG. 1, showing the windshield wiper structure of FIG. 1 in position retracted from the windshield, and also showing a spring holding the windshield wiper structure in the retracted position, and also showing schematically an electric lead attached to and extending from the spring; and FIG. 3 is a side elevation of the wiper blade in engagement with the windshield.

DESCRIPTION OF THE INVENTION

The drawing shows a windshield wiper structure, indicated generally at 10, embodying the invention. Structure 10 includes a wiper blade 12 (FIG. 3) of rubber-like material for engaging a windshield 14 (FIGS. 1 and 3) of a vehicle. Supporting elements for blade 12 include a metallic wiper blade carrier 16 which carries blade 12, and a metallic wiper arm 18 connected at one end to carrier 16 and the other end of which is pivotally mounted through a metallic end piece 20 on a metallic post 22 for reciprocating rotary motion about post 22, all in known fashion. Post 22 is suitably secured through shell 24 of the vehicle just below windshield 14. A metallic coil spring 26 (FIG. 2) has one end in engagement with a hole 28 through an extension of post 22 and the other end in engagement with a hole 30 through arm 18. Spring 26 selectively resiliently urges blade 12 with its edge against windshield 14 as shown in FIGS. 1 and 3 or in position retracted from windshield 14 as shown in FIG. 2.

An electrical lead 32 is connected to spring 26 for connection via a connector 34 to the electrical system of the vehicle.

Thus, structure 10 uses spring 26 as a heating element tending to melt snow and ice from blade 12 and supporting elements 16, 18 and 20 permitting blade 12 to conform to windshield 14. Aside from blade 12, the other elements of structure 10 are typically metallic and hence electrically conductive and will heat up at least minimally along with spring 26. Blaney U.S. Pat. No. 2,677,143, issued May 4, 1954, discloses an electrically heated windshield wiper, and teaches the use of insulator members where desired therein. Accordingly, it may be desirable to provide insulating material between post 22 and spring 26 and/or between end piece 20 and post 22 and/or between wiper arm 18 and end piece 20.

To provide further resistance to snow and ice build-up blade 12, except for its edge, is preferably coated with wetting resistant plastic material, a preferred example of which is polytetrafluoroethylene, as indicated at 36. Blade carrier 16, wiper arm 18 and end piece 20 are coated with polytetrafluoroethylene, as indicated at 38, 40 and 42, respectively. It is noteworthy that wiper blade carrier 16 is somewhat flexible, as is blade 12, there being a gap 44 therebetween. This flexibility enables blade 12 to be self-conforming to windshield 14 unless gap 44 becomes clogged with ice or snow. The present invention is particularly effective in preventing such clogging.

It is apparent that the invention achieves the foregoing objects and advantages and others.

The disclosed details are exemplary only and are not to be taken as limitations on the invention except as those details may be included in the appended claims.

What is claimed is:

1. In windshield wiper structure, a wiper blade for engaging a windshield of a vehicle, a metallic wiper blade carrier for carrying the blade, a metallic wiper arm connected to said carrier, a metallic post for reciprocating rotary motion, said wiper arm connected to said post via a metallic end piece, a metallic spring engaging said post and said wiper arm for selectively resiliently urging said blade against or away from the windshield, and an electrical lead connected to said spring for connection to the electrical system of the vehicle, said structure utilizing said spring as a heating element for tending to melt snow and ice from said blade and other elements of said system.

2. Windshield wiper structure according to claim 1 wherein said blade and said wiper blade carrier are flexible and there is a gap therebetween and said blade except for its edge and said carrier are coated with non-wettable plastic material which tends to prevent ice or snow from clogging said gap.

3. Windshield wiper structure according to claim 1 wherein said blade except for its edge is coated with wetting resistant plastic material.

4. Windshield wiper structure according to claim 2 wherein said material is polytetrafluoroethylene.

5. Windshield wiper structure according to claim 3 wherein said material is polytetrafluoroethylene.

* * * * *